(12) United States Patent
Spelman et al.

(10) Patent No.: US 9,107,445 B2
(45) Date of Patent: Aug. 18, 2015

(54) BEVERAGE COMPOSITION WITH FOAM GENERATING COMPONENT

(75) Inventors: Kieran Patrick Spelman, New City, NY (US); Antonio Paulo Pivesso, Jr., Campo Largo (BR); Marcio Hideo Nagata, Curitiba (BR); Dalip Kumar Nayyar, Grayslake, IL (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 494 days.

(21) Appl. No.: 12/501,353

(22) Filed: Jul. 10, 2009

(65) Prior Publication Data

US 2011/0008514 A1    Jan. 13, 2011

(51) Int. Cl.
| | | |
|---|---|---|
| A23L 2/00 | (2006.01) | |
| A23L 2/39 | (2006.01) | |
| A23L 2/40 | (2006.01) | |
| A23L 2/52 | (2006.01) | |
| A23L 2/54 | (2006.01) | |
| A23L 2/68 | (2006.01) | |

(52) U.S. Cl.
CPC ... *A23L 2/39* (2013.01); *A23L 2/40* (2013.01); *A23L 2/52* (2013.01); *A23L 2/54* (2013.01); *A23L 2/68* (2013.01)

(58) Field of Classification Search
None
See application file for complete search history.

(56) References Cited

U.S. PATENT DOCUMENTS

| | | | |
|---|---|---|---|
| 1,690,131 | A | 11/1928 | Robison |
| 1,883,150 | A | 10/1932 | Washburn |
| 2,851,359 | A | 9/1958 | Diller |
| 2,868,646 | A | 1/1959 | Schapiro |
| 3,395,021 | A | 7/1968 | Glicksman et al. |
| 3,441,417 | A | 4/1969 | Feldman et al. |
| 3,695,890 | A | 10/1972 | Miller |
| 4,198,400 | A | 4/1980 | Biegler |
| 4,233,334 | A | 11/1980 | Owades |
| 4,438,147 | A | 3/1984 | Hedrick |
| 2,851,360 | A | 9/1985 | Diller |
| 4,551,342 | A | 11/1985 | Nakel et al. |
| 4,571,338 | A | 2/1986 | Okonogi et al. |
| 4,986,994 | A * | 1/1991 | Baccus, Jr. ................. 426/330.3 |
| 5,013,576 | A | 5/1991 | Nakazawa et al. |
| 5,350,591 | A | 9/1994 | Canton |
| 5,589,590 | A | 12/1996 | Ledon et al. |
| 5,853,785 | A * | 12/1998 | Nayyar et al. ................ 426/565 |
| 6,048,567 | A | 4/2000 | Villagran et al. |
| 6,290,997 | B1 | 9/2001 | Villagran et al. |
| 6,379,737 | B1 | 4/2002 | Butterbaugh et al. |
| 6,607,761 | B2 | 8/2003 | Henry et al. |
| 6,713,113 | B2 | 3/2004 | Bisperink et al. |
| 6,730,336 | B2 | 5/2004 | Villagran et al. |
| 6,953,592 | B2 | 10/2005 | Darbyshire et al. |
| 7,534,461 | B2 * | 5/2009 | Zeller et al. ................... 426/564 |
| 2002/0001656 | A1 | 1/2002 | Mason et al. |
| 2002/0034574 | A1 * | 3/2002 | Prosise et al. ................. 426/560 |
| 2002/0136816 | A1 | 9/2002 | Kim |
| 2005/0163904 | A1 | 7/2005 | Walker et al. |
| 2005/0233016 | A1 | 10/2005 | Hansen |
| 2005/0287276 | A1 | 12/2005 | Lavoie et al. |
| 2006/0040023 | A1 * | 2/2006 | Zeller et al. ................... 426/438 |
| 2006/0040034 | A1 * | 2/2006 | Zeller et al. ................... 426/564 |
| 2006/0040038 | A1 | 2/2006 | Zeller et al. |
| 2006/0051483 | A1 * | 3/2006 | Watanabe et al. ............. 426/564 |
| 2006/0110516 | A1 | 5/2006 | Holtus et al. |
| 2008/0069924 | A1 * | 3/2008 | Zeller et al. ..................... 426/61 |
| 2008/0286421 | A1 * | 11/2008 | DeLease et al. ............... 426/112 |

FOREIGN PATENT DOCUMENTS

| | | |
|---|---|---|
| EP | 0 813 815 A1 | 12/1997 |
| EP | 1 627 572 A1 | 2/2006 |
| JP | 63007768 | 1/1988 |
| JP | 2003/310212 | 11/2003 |
| WO | WO 2009/080596 A2 | 7/2009 |

OTHER PUBLICATIONS

Product Overview Sheet on Quillaja (quillaia) Saponaria Extract Powder by Garuda, Jul. 12, 2011, p. 1.*

* cited by examiner

*Primary Examiner* — Tamra L Dicus
(74) *Attorney, Agent, or Firm* — Stephen J. Weyer; Stites & Harbison, PLLC

(57) ABSTRACT

A composition has a gas containing agent or gas producing agent, a foam stabilizer and a food acid source. In one advantageous form, when the composition is dissolved in a liquid medium, a resulting beverage preferably has a pH between 2.5 and 5.4, and a viscosity between 1.0 and 10.0 cP when at a concentration between 1 and 150 grams per liter at a temperature between 2 and 28° C. In another advantageous form, the composition is water soluble in cold water, e.g., at a temperature between 2 and 28° C. In an alternative form, various components of the composition will be present in a premade liquid to which a gas containing agent or gas producing agent is added just prior to consumption.

64 Claims, No Drawings

BEVERAGE COMPOSITION WITH FOAM GENERATING COMPONENT

FIELD OF THE INVENTION

The present invention relates to a beverage composition and, in particular, a beverage having a component capable of producing a foam when dissolved in a liquid, without mechanical agitation sufficient to incorporate air in the liquid.

BACKGROUND OF THE INVENTION

Consumers are desirous of consuming novel confections, gourmet quality foods, and beverages which require a minimal amount of time and preparation thereof. Examples of desirous beverages include freshly prepared and/or squeezed fruit beverages, such as orange juice, pineapple juice and lemonade. Other desirous beverages include soft drinks having foam on top, such as root beers, cola and fruit-flavored soda beverages. Attributes of freshly prepared fruit beverages include the presence of foam, which is produced on a top surface of a freshly squeezed or freshly prepared fruit drink from the respective fruit during the preparation, such as the squeezing, blending or extraction processes. The amount of foam in freshly prepared drinks typically can be in the range of 10 to 400 ml/liter, 1 minute after the preparation. Soft drinks can have foam up to 100% of the liquid volume and the foam can last up to 48 hours.

For convenience and ease of preparation, prior instant, also known as powder compositions or powder beverages have been developed. In order to prepare a beverage from prior powders, a consumer mixes the powder beverage with water to produce the liquid beverage.

One disadvantage of conventional liquid beverages produced from prior powders is that the resulting liquid beverage does not have many of the characteristics which consumers associate with freshly prepared, e.g., squeezed or blended, fruit beverages, or other soft drink beverages, such as foam on top. For example, typically liquid beverages produced from prior soluble fruit-flavored and non-fruit flavored compositions will not have foam on the top surface of the liquid without some type of physical agitation, stirring or mixing in a blender sufficient to incorporate air into the liquid. Further, the resulting prior liquid beverage will not have the same consistency in terms of aerated liquid which consumers associate with a beverage which has been produced by a squeezing, blending or extraction process, or a soft drink that has a foam on top. In addition, prior soluble beverages do not have the same texture as freshly squeezed fruit drinks, which often contain pulp or pieces of fruit.

In the beverage art, there are dry mix fruit-flavored beverages which produce a highly viscous, slushy-type fruit-flavored beverage when mixed with water, optionally ice, and possibly prepared in a blender. One such prior beverage is disclosed in U.S. Patent Application Publication No. 2002/0001656.

U.S. Pat. No. 6,730,336 discloses various flavored beverage products, including a fruit-flavored beverage product which produces a creamy beverage using a fat substitute, whey protein, known as SIMPLESSE®.

There exists a need in the instant beverage art for a new and improved composition which when placed in water mimics a freshly squeezed fruit juice beverage.

SUMMARY OF THE INVENTION

The present invention relates to a powder composition capable of producing a foam when dissolved in a liquid without mechanical agitation sufficient to incorporate air into the liquid. The composition which, when dissolved in the liquid such as water, mimics a freshly squeezed fruit juice product, a soft drink, such as root beer, or any type of beverage where a foam is produced on top. New types of beverage with foam up to 100% of the volume of the liquid can also be created. The fruit flavors include, but are not limited to, orange, lemon, lime, passion fruit, grape and pineapple. One ingredient which provides for mimicking freshly squeezed fruit juices is a gas containing agent or a gas producing agent, collectively also referred to in the art as a foam booster. An example of a gas containing agent is a compound with either or both entrapped gas (pressurized or at atmospheric pressure) and/or held gas. An example of a gas producing agent is a chemical foamer, such as sodium bicarbonate/carbonate which, in conjunction with a food acid, produces foam when the composition is dissolved in a liquid.

The present invention, in one form thereof, relates to a powder composition comprising a gas containing agent, a foam stabilizer and a food acid source. In one advantageous form of the composition, when the composition is dissolved in a liquid medium, the resulting beverage has a pH between 2.5 and 5.4 and the composition produces at least 2.5 ml of foam per gram of the composition on a top surface of the resulting beverage, without mechanical agitation sufficient to incorporate air into the liquid medium. In another advantageous form, insoluble material, which may include fiber, is present in the powder composition.

The present invention, in another form thereof, relates to a beverage containing a composition comprising a powder composed of the following ingredients: a gas containing agent or a gas producing agent, quillaia and a food acid. When the composition is dissolved in a liquid medium, the resulting beverage has a pH between 2.5 and 5.4, and the composition produces at least 2.5 ml of foam per gram of the total powder amount on a top surface of the resulting beverage, without mechanical agitation sufficient to incorporate air into the liquid.

The present invention, in yet another form thereof, relates to a beverage containing a composition comprising a powder composed of the following ingredients in weight percent of the powder amount:
 a gas generating agent or gas producing agent in an amount between 0.25 to 99.6 weight percent,
 foam stabilizer in an amount between 0.025 and 81.6 weight percent, and
 citric acid in an amount between 0.337 and 99.45 weight percent.

The present invention, in yet another form thereof, relates to a method for producing a drink from a powder composition. The method includes taking a powder composition comprising a gas containing agent or gas producing agent, a foaming stabilizer, and a food acid source. The powder composition is combined with liquid to produce a liquid beverage with foam on a top surface of the beverage without using mechanical agitation sufficient to incorporate air into the liquid.

The present invention in another form thereof relates to a beverage kit which comprises a liquid beverage component and a powder component. The liquid beverage component comprises a food acid source. The powder component comprises a gas containing agent or a gas producing agent and a foam stabilizer. When the powder component is placed in the liquid containing the food acid component the foam volumes are between 2.5 and 92.5 mls of foam is produced per gram, including a preferred amount of 35 ml of foam per gram of the powder component on top of the resulting beverage without mechanical agitation sufficient to incorporate air into the liquid.

DETAILED DESCRIPTION

The present composition, in one advantageous form, comprises a gas containing agent or a gas producing agent, a foam stabilizer and a food acid. When the composition is dissolved in a liquid medium such as water, the composition produces a range of liquid beverages having different levels of foam, as desired.

The gas containing agent includes a class of compounds in which gas is entrapped in a solid structure, entrapped in internal voids of an amorphous structure, or held in opened internal voids of an amorphous structure of the compound. The entrapped gas is either pressurized or at atmospheric pressure. An example of one advantageous gas containing agent, is a carbohydrate which has been processed to contain entrapped pressurized nitrogen gas. Other gas containing agents include compositions processed to contain held atmospheric gas. Examples of other specific gas containing agents and compositions, as well as methods for producing such gas containing agents, can be found in U.S. Pat. No. 7,534,461; U.S. Patent Application Publication Nos. 2006/0040023; 2006/0040033; 2006/0040034; and 2008/0069924; all herein incorporated by reference. When the composition containing the gas containing agent is dissolved in a liquid, the gas containing agent, dissolves, releasing the gas (e.g., nitrogen gas, if the agent is a composition with entrapped pressurized nitrogen gas) as bubbles which produce a foam on a top surface of the resulting beverage, without mechanical agitation sufficient to incorporate air into the beverage. Preferably, the gas containing agent should be present in an amount of between 0.25 and 99.6 weight percent based on a total weight of the gas containing agent, foam stabilizer and food acid components.

The gas producing agent can be a chemical foamer, such as a bicarbonate or carbonate composition, e.g., as sodium bicarbonate or potassium bicarbonate. When the present composition containing a carbonate/bicarbonate source and the food acid is dissolved in a liquid medium, a chemical reaction occurs between the carbonate/bicarbonate source and the acid to generate carbon dioxide gas which produces a foam on a top surface of the resulting beverage, without mechanical agitation of the mix, sufficient to incorporate air within the liquid medium. Preferably, the gas producing agent is present in an amount between 1.7 and 98.8 weight percent based on a total weight of the gas producing agent, foam agent stabilizer and food acid.

Advantageously, the foam stabilizer is present which is either part of the gas generating composition or is a separate component to help maintain the foam on the surface of the liquid for a desired duration to match that of a freshly prepared target drink, e.g., freshly squeezed orange juice or a root beer soda to name just two possible drinks.

With regard to both the gas containing agent, such as a composition with entrapped gas, and the gas producing agent, the present composition will produce at least 2.5 ml of foam per gram of the total mass of the gas containing agent and/or gas producing agent, foam stabilizer and food acid constituents in the powder composition when dissolved in a liquid medium, without mechanical agitation sufficient to incorporate air into the liquid medium. The volume and duration of resulting foam preferably mimics the amount which would be present in a freshly squeezed or prepared fruit beverage or a soda beverage, or can be a new type of beverage that contains foam of desired volume and duration. The resulting foam preferably has a lasting duration of at least 15 minutes and preferably a duration in the range of between 30 and 360 minutes.

The foam stabilizer may consist of quillaia, yucca, soluble gelatin, modified starch or any food grade foam stabilizer. The foam stabilizer, in conjunction with the gas containing agent or gas producing agent, helps to sustain the foam produced when the composition containing the gas containing agent or gas producing agent, is dissolved in a liquid.

Where the beverage is to mimic freshly prepared fruit juice, the composition may contain insoluble material. The term "insoluble material," as used in this disclosure, is defined as materials which are not soluble in water but are dispersed or suspended when mixed with water, including oil emulsions (e.g., flavor emulsions), clouding agents (e.g., titanium dioxide), anti-caking agents (e.g., silicon dioxide). The insoluble material can be hydrocolloids, such as, but not limited to, gum Arabic, guar gum, gellan gum, carboxymethylcelluloses, carrageenan, xanthan gum starch, agar, natural and chemically modified starches. Alternatively, or in conjunction with one or more hydrocolloids, the composition may contain insoluble material, such as dried pulp, pulp analogues and/or insoluble fiber. Examples of dried pulp and insoluble fiber include, whole dried fruit pulps, dried fruit fiber components. Examples of pulp analogues include, starches modified to be insoluble, alginates, sodium alginates or any insoluble food grade material made to resemble the fruit pulp present in fruit juice.

Advantageously, when present, the insoluble material comprises particles having an average particle size of between 0.1 and 600 microns. Further, preferably, the maximum dimension of the particles which comprise the insoluble material is between 1000 and 3000 microns:

The food acid can be any appropriate food acid which would be known by one of ordinary skill in the art. One such food acid is citric acid, which is found in natural fruit juices. The acid could be food grade acids such as but not limited to citric acid, malic acid, fumaric acid, phosphoric acid, lactic acid, adipic acid, ascorbic acid sodium acid pyrophosphate, sodium or potassium bisulfate. The amount of food acid present in the powdered fruit-flavored composition is such that when the composition is dissolved in a liquid medium, the resulting beverage has a preferable pH between 2.5 and 5.4, and in many instances less than 4.0, although the pH could be as high as 6.5 depending on the desired beverage.

It should be emphasized that the amount of food acid, along with the amount of carbonate/bicarbonate, when the composition contains carbonate/bicarbonate, should be such that when the composition is dissolved in a liquid, e.g., water, the resulting beverage has the desired pH, the desired amount of foam on the top surface of the beverage, and can either produce enough dissolved carbon dioxide to produce a liquid beverage which tastes carbonated or not carbonated. In other words, as desired, the amount of carbonate/bicarbonate and citric acid can be adjusted to produce enough carbon dioxide dissolved in the liquid medium to form a carbonated beverage or a beverage which a consumer would identify and associate with a carbonated beverage or be at a level low enough not to produce enough carbon dioxide so that a consumer would identify the beverage as not being carbonated.

The gas containing agent, ideally, in one form, is a non-protein composition. One such composition would be a gas containing agent or gas producing agent, consisting essentially of a carbohydrate. Such a gas containing agent or gas producing agent, would preferably have less than 1% protein and, more preferably, less than 0.5% protein.

The amount of gas containing agent and/or gas producing agent, in conjunction with the foam stabilizer, e.g., quillaia and soluble gelatin, when dissolved in a liquid, produces a liquid beverage which mimics a freshly prepared fruit-drink or soda beverage viscosity. For example, an orange flavored beverage may have a viscosity of around 2.2-3.0 cP (25° C.) to mimic natural orange juice's 2.8 cP. A pineapple beverage may have a viscosity of 2.9 cP to 3.3 cP (25° C.) to mimic natural pineapple juice's 3.3 cP (25° C.) and a grape beverage may have a viscosity of 2.1-3.0 (25° C.) to mimic natural grape juice's 2.3 cP (25° C.).

The present composition may optionally contain a fruit flavor source. The fruit flavor source can be any natural fruit flavor produced from the respective fruit itself, nature identical, artificial flavor additives or a combination of these types.

The flavors of the present beverage include but are not limited to: acerola, apple, berries, caja, cashew, grape, grapefruit, graviola, guava, hibiscus, horchata, lemon, lemonade, lime, mandarin, mango, melon, orange, orange-banana, orange-banana-strawberry, orange-grapefruit-lime, orange-mango, orange-papaya, orange-strawberry-kiwi, passion fruit, peach, pear, pear-banana, pineapple, pineapple-coconut, seriguela, strawberry, sweet orange, tamarind, tangerine, tuna (cactus fig) and watermelon.

In addition to the gas containing agent or gas producing agent, foam stabilizer, food acid source, optional insoluble material and optional fruit flavor, the present powder composition may include sugar, such as sucrose, fructose, dextrose or any type of sugar and/or a sugar substitute, such as aspartame, acesulfame potassium, cyclamate, saccharin, neotame or SPLENDA; or any other artificial or natural high potency sweetener, and or any type of sugar alcohol, or any combination of the these sweeteners, natural and/or artificial colors; vitamins, such as Vitamin C; and nutrients and minerals; e.g., an iron source.

The amount of foam produced by the gas containing agent or gas producing agent should be an amount which closely mimics that of freshly prepared fruit drinks or soda beverages to which the present composition is designed to mimic. For example with regard to pineapple, the volume should be 30 ml, and with regard to grape, lime, orange and peach the volume should be 7 ml per gram of a composition containing citric acid, gas entrapped in carbohydrate composition and quillaia. With regard to soft drinks, such as root beer, the volume should be 27 ml per gram of a composition containing citric acid, sodium and potassium bicarbonate and quillaia.

Advantageously, the composition is present in an instant powder form, which could be the beverage composition or the beverage kit, in an amount so that when the composition is dissolved in a liquid, such as water, the resulting liquid beverage will have the following concentrations in grams per liter:

| | |
|---|---|
| either gas containing agent or producing agent: | 0.1 to 35.0, |
| and/or carbonates/bicarbonates: | 0.1 to 20.0, |
| citric acid: | 0.125 to 20.0, |
| either quillaia: | 0.01 to 1.0, |
| and/or cold water soluble gelatin: | 0.01 to 10.0, and |
| insoluble material: | 0 to 20.00. |

In one advantageous form, the amount of insoluble material in the composition should be in an amount such that when the composition is dissolved in a liquid, e.g., water, the viscosity of the resulting beverage is between 1 cP and 100 cP, and preferably between 1.29 and 8.94 cP, depending on the beverage. For example, if the composition contains insoluble material, the amount of insoluble material should be in the range of 0.022 to 98.84 weight percent of the total weight of the composition containing the gas containing agent or producing agent, citric acid, bicarbonate, quillaia and/or soluble gelatin. One of ordinary skill in the art will now be readily able to adjust the amount of gas containing agent and/or gas producing agent, foam stabilizer and insoluble material to adjust the viscosity of a resulting beverage to mimic the texture and viscosity of natural beverages and conventional soft drinks.

Advantageously, the present composition is cold water soluble, e.g., at a temperature between 2 and 28° C. Preferably, the present composition (comprising all but the previously stated insoluble portion) is soluble at 150 grams per liter at a temperature of between 2 and 28° C.

One manufacturing method for preparing a composition in accordance with the present disclosure includes a first step of mixing minor ingredient such as colors, vitamins, flavors, for 10 minutes. This material is then considered to a second set of ingredients, including this pre-mix (first step) with all the other ingredients, usually major ingredients, like sugar, citric acid, gas containing agent or a gas producing agent, foam stabilizer, insoluble materials, etc. This final mixture is mixed for 10 minutes. The mixing conditions for both steps are in an environment of around 45% relative humidity with a temperature of around 22° C.

A liquid beverage is produced from the present powder beverage by measuring out an appropriate amount of the powder and adding it to a desired amount of water, to achieve a preferred beverage flavor and strength. Preferably, the water is cold, at a temperature around 2 to 10° C. although the temperature could be as high as 28° C. The water with powder is stirred to dissolve the soluble components of the powder. As the powder is mixed with the water, gas is released or produced, depending on the foam booster present, which produces foam on top of the resulting beverage.

A premade liquid composition in accordance with the present invention may contain a food acid source along with all other ingredients of the food beverage, such as those in Example 14 below, except for the gas containing and/or gas generating component and the foam stabilizer. In one advantageous form, the liquid will be packaged separately from a powder containing the gas containing agent or gas producing agent and the foam stabilizer. A consumer purchasing the product will add the gas containing agent or gas producing agent and the foam stabilizer agent to the liquid prior to consumption of the beverage. Upon putting the gas containing agent or gas producing agent and the foam stabilizer into the liquid, gas will be generated which will produce the desired foam and provide for desired consistency of the beverage to mimic a freshly prepared fruit drink such as freshly squeezed fruit juice or a freshly prepared soda beverage such as root beer.

In one alternative advantageous form, various components of the present beverage are packaged separately for being mixed together with a liquid, such as water, prior to consuming. For example, a first packet may comprise all components of a powder beverage, e.g. a powder orange drink. A second package may comprises the foam booster, e.g. the present gas containing agent or gas producing agent and the foam stabilizer. To produce a liquid beverage, a consumer would add the contents of the two separate packets to water, followed by stirring to produce a liquid beverage which mimics a freshly prepared beverage, e.g. freshly squeezed orange juice. In various further alternative embodiments, the first packet may contain a food acid and the two packets may contain any of the various dry components of any other the example beverages described throughout this disclosure.

The present composition is further described with reference to the following, non-limiting examples.

EXAMPLE 1

An Orange Flavored Beverage

| Ingredient | Amount (g/liter) | Percent by weight (powder) |
|---|---|---|
| sugar | 20.9412 | 69.80 |
| citric acid | 4.7000 | 15.67 |
| entrapped gas foaming composition | 0.8000 | 2.67 |
| potassium citrate | 0.5000 | 1.67 |
| thickener | 0.5087 | 1.70 |
| high intense sweetener | 0.4740 | 1.58 |
| flavor | 0.4210 | 1.40 |
| soluble orange powder juice | 0.3700 | 1.23 |
| insoluble fibers | 0.3200 | 1.07 |
| tricalcium phosphate | 0.2736 | 0.91 |
| color | 0.2010 | 0.67 |
| insoluble orange pulp | 0.2000 | 0.67 |
| vitamin + mineral | 0.1880 | 0.63 |
| titanium dioxide | 0.0625 | 0.21 |
| foam stabilizer | 0.0400 | 0.13 |
| total | 30.0000 | 100.00 |

1. The powder of the above formula was placed in a glass beaker (internal diameter of 65 mm, uniform wall)
2. 300 ml of water (25° C.) was added to the beaker;
3. This was manually stirred using a teaspoon, 10 times at a speed of 1 rotation per second;
4. 1 minute later the foam height was measured and recorded.

In this example, the weight percent of gas containing agent is 14.4, the weight percent of foam stabilizer is 0.7 and the weight percent of food acid is 84.9, as a percentage of these three components. When 30 g of the above powder is dissolved in 1 l of water at between 2 to 28° C., 66 ml of foam was produced. This corresponds to 12 ml foam produced per gram of the total amount of citric acid, entrapped gas composition and foam stabilizer. The foam lasted for 220 minutes. The viscosity of the beverage was 2.4 cP. The present beverage is comparable to freshly prepared orange juice which will have 55 ml foam for a duration of 120 minutes and a viscosity of 2.8 cP. The pH of the beverage is 3.05. Accordingly, the present beverage mimics the characteristics of the freshly prepared orange juice.

EXAMPLE 2

A Second Orange Flavored Beverage

| Ingredient | g/liter | % |
|---|---|---|
| sugar | 111.7600 | 93.13 |
| citric acid | 5.0000 | 4.17 |
| pressurized foaming composition | 0.5000 | 0.42 |
| potassium citrate | 0.5000 | 0.42 |
| thickener | 0.4000 | 0.33 |
| flavor | 0.4500 | 0.38 |
| insoluble fibers | 0.3200 | 0.27 |
| tricalcium phosphate | 0.2800 | 0.23 |
| color | 0.2000 | 0.17 |
| insoluble orange pulp | 0.5000 | 0.42 |
| titanium dioxide | 0.0550 | 0.05 |
| foam stabilizer | 0.0350 | 0.03 |
| total | 120.0000 | 100.00 |

EXAMPLE 3

A Pineapple Flavored Beverage

| Ingredient | g/liter | % |
|---|---|---|
| sugar | 22.9132 | 69.71 |
| citric acid | 3.0000 | 10.00 |
| pressurized foaming composition | 2.0000 | 6.67 |
| flavor | 0.9450 | 3.15 |
| thickener | 0.6584 | 2.19 |
| soluble pineapple powder juice | 0.5300 | 1.77 |
| tricalcium phosphate | 0.4043 | 1.35 |
| insoluble fiber | 0.4000 | 1.33 |
| high intense sweetener | 0.3904 | 1.30 |
| sodium citrate | 0.3599 | 1.20 |
| vitamin + mineral | 0.1875 | 0.63 |
| titanium dioxide | 0.0482 | 0.16 |
| foam stabilizer | 0.1600 | 0.53 |
| color | 0.0031 | 0.01 |
| total | 30.0000 | 100.00 |

1. 9 g of the powder of the above formula was placed in a glass beaker (internal diameter of 65 mm, uniform wall)
2. 300 ml of water (25° C.) was added to the beaker;
3. This was manually stirred using a teaspoon, 10 times at a speed of 1 rotation per second;
4. 1 minute later the foam height was measured and recorded.

In this example, the weight percent of gas containing agent is 38.8, the weight percent of foam stabilizer is 3.1 and the weight percent of food acid is 58.1, as a percentage of these three components. When 30 g of the above powder is dissolved in 1 l of water at between 2 to 28° C., 121 ml of foam was produced. This corresponds to 23.4 ml foam produced per gram of the total amount of citric acid, entrapped gas composition and foam stabilizer. The present beverage is comparable to freshly prepared orange juice which will have 132 ml foam. Accordingly, the present beverage mimics the characteristics of the freshly prepared pineapple juice.

EXAMPLE 4

A Grape Flavored Powdered Beverage

| Ingredient | g/liter | % |
|---|---|---|
| vitamin + mineral | 0.2383 | 0.68 |
| tricalcium phosphate | 0.2000 | 0.57 |
| titanium dioxide | 0.0077 | 0.02 |
| thickener | 0.5673 | 1.62 |
| sugar | 27.5318 | 78.66 |
| soluble grape powder juice | 0.5110 | 1.46 |
| sodium citrate | 0.5000 | 1.43 |
| maltodextrin | 0.0206 | 0.06 |
| high intense sweetener | 0.4819 | 1.38 |

-continued

| Ingredient | g/liter | % |
|---|---|---|
| fumaric acid | 1.0080 | 2.88 |
| flavor | 0.0735 | 0.21 |
| pressurized foaming composition | 0.8000 | 2.29 |
| foam stabilizer | 0.0400 | 0.11 |
| color | 0.1400 | 0.40 |
| citric acid | 2.8800 | 8.23 |
| total | 35.0001 | 100.00 |

EXAMPLE 5

A Passion Fruit Flavored Powdered Beverage

| Ingredient | g/liter | % |
|---|---|---|
| vitamin + mineral | 0.1873 | 0.62 |
| tricalcium phosphate | 0.4527 | 1.51 |
| titanium dioxide | 0.0700 | 0.23 |
| thickener | 0.4650 | 1.55 |
| sugar | 21.1707 | 70.57 |
| soluble passion fruit juice | 0.3400 | 1.13 |
| sodium citrate | 0.8500 | 2.83 |
| pressurized foaming composition | 0.5000 | 1.67 |
| insoluble fiber | 0.4000 | 1.33 |
| high intense sweetener | 0.3397 | 1.13 |
| foam stabilizer | 0.0400 | 0.13 |
| flavor | 0.4200 | 1.40 |
| color | 0.0146 | 0.05 |
| citric acid | 4.7500 | 15.83 |
| total | 30.0000 | 100.00 |

EXAMPLE 6

A Pineapple Mint Flavored Powdered Beverage

| Ingredient | g/liter | % |
|---|---|---|
| vitamin + mineral | 0.2383 | 2.38 |
| tricalcium phosphate | 0.4000 | 4.00 |
| titanium dioxide | 0.0625 | 0.63 |
| thickener | 0.1300 | 1.30 |
| sodium citrate | 0.3000 | 3.00 |
| maltodextrin | 2.7836 | 27.84 |
| high intense sweetener | 0.4600 | 4.60 |
| flavor | 0.0735 | 0.74 |
| pressurized foaming composition | 1.0000 | 10.00 |
| foam stabilizer | 0.0400 | 0.40 |
| color | 0.0121 | 0.12 |
| citric acid | 4.5000 | 45.00 |
| total | 10.0000 | 100.00 |

EXAMPLE 7

The amount of foam produced from various compositions, in accordance with the present beverage compositions, were prepared the eight compositions below, having varying amounts of quillaia (foam stabilizer) and a gas containing agent produced by Kievit carbohydrate powder comprised of Maltodextrin and modified starch containing pressurized nitrogen gas made according to the teachings of U.S. Pat. No. 7,534,461, containing 20-25 ml of gas per gram of material. The eight samples below were dissolved in 300 ml liquid (water) in a 6.5 cm diameter cylindrical container, at 25° C., and the amount of foam produced was measured in terms of height of foam produced right after the respective sample was dissolved in the liquid, and at 4 hours. The results are summarized in the table below.

| | FOAM INGREDIENTS | | | | |
|---|---|---|---|---|---|
| FRUIT FLAVOR | Quillaia extract (gr/l) | foam booster (gr/l) | BEGINNING Height (cm) | END Height (cm) | Time (hr) |
| Pineapple and Grape | 0.16 | 2.0 | 1.1 | 0.4 | 04:00 |
| Passion Fruit | 0.16 | 1.0 | 0.9 | 0.2 | 04:00 |
| Pineapple and Grape | 0.08 | 2.0 | 1.1 | 0.3 | 04:00 |
| Passion Fruit | 0.08 | 1.0 | 0.9 | 0.2 | 04:00 |
| Pineapple and Grape | 0.04 | 2.0 | 1.05 | 0.4 | 04:00 |
| Passion Fruti | 0.04 | 1.0 | 0.6 | 0.2 | 04:00 |
| Passion Fruit | 0.02 | 2.0 | 0.9 | 0.2 | 04:00 |
| Orange and Lemon | 0.02 | 1.0 | 0.4 | 0 | 04:00 |

| NATURAL FRUIT JUICE | BEGINNING Height (cm) |
|---|---|
| Pineapple and Grape | 1.0-1.4 |
| Passion Fruit | 0.6-0.8 |
| Orange and Lemon | 0.5-0.6 |

EXAMPLE 8

In this example, the height of foam produced from various amounts of foamer and foam stabilizer were measured over time. As with the samples in Example 7, four samples labeled Level 1-Level 4, containing varying amounts of foamer Kievit and foam stabilizer, quillaia, were dissolved in a liquid (water) present in a cylindrical container having a diameter of 6.5 cm.

| Ingredients | Time (min.) | Level 1 | Level 2 | Level 3 | Level 4 |
|---|---|---|---|---|---|
| Kievit | | 0.8 g/liter | 1.25 g/liter | 2.5 g/liter | 3.75 g/liter |
| Quillaia Extract QUEXT-100 | | 0.04 g/liter | 0.1 g/liter | 0.2 g/liter | 0.2 g/liter |
| Results | 0 | 0.6 cm | 1.0 cm | 1.7 cm | 2.3 cm |
| | 31 | 0.5 cm | 0.7 cm | 1.3 cm | 1.6 cm |
| | 63 | 0.4 cm | 0.7 cm | 1.3 cm | 1.5 cm |
| | 100 | 0.4 cm | 0.7 cm | 1.3 cm | 1.5 cm |
| | 130 | 0.3 cm | 0.6 cm | 1.3 cm | 1.5 cm |

| Ingredients | Time (min.) | Level 1 | Level 2 | Level 3 | Level 4 |
|---|---|---|---|---|---|
| | 200 | 0.3 cm | 0.6 cm | 1.3 cm | 1.4 cm |
| | 220 | 0.1 cm | 0.6 cm | 1.3 cm | 1.4 cm |
| | 250 | 0.0 cm | 0.5 cm | 1.2 cm | 1.4 cm |
| | 1080 | 0.0 cm | 0.1 cm | 0.6 cm | 0.7 cm |

EXAMPLE 9

The foaming composition may contain a powder consisting of a gas containing agent or producing agent, citric acid, quillaia, and/or gelatin and insoluble material, but not carbonates/bicarbonates, in the amounts summarized in the table below.

| Ingredient | Range (g) | Ratio relative to Quillaia | Range wt. % of powder |
|---|---|---|---|
| Gas Containing Agent | 0.1-10 | 10-100 | 16.37-21.74 |
| Carbonates/Bicarbonates | 0-20 | 0-2000 | 0-98.8 |
| Citric Acid | 0.125-25 | 6-500 | 54.35-81.83 |
| Quillaia | 0.00-1 | 1 | 0.16-2.17 |
| Gelatin | 0.0-10 | 10 | 1.64-21.74 |
| Insoluble Material | 0-20 | 0-2000 | 0-98.4 |
| Total | 0.611-46 | — | 100.00 |

EXAMPLE 10

The following example is a composition which does not contain a gas containing foam booster but, instead, relies on a chemical carbonate/bicarbonate based composition as the foam booster.

| Ingredient | Range (g) | Ratio relative to Quillaia | Range wt. % of powder |
|---|---|---|---|
| Carbonates/Bicarbonates | 0.1-20 | 20-100 | 16.37-35.71 |
| Citric Acid | 0.5-25 | 25-500 | 44.64-81.83 |
| Quillaia | 0.001-1 | 1 | 0.16-1.79 |
| Gelatin | 0.01-10 | 10 | 1.64-17.86 |
| Insoluble Material | 0-20 | 0-2000 | 0-98.4 |
| Total | 0.611-56 | — | 100.00 |

EXAMPLE 11

This example relates to a fruit-flavored composition which contains both a gas producing agent, i.e., a pressurized gas composition and a gas generating composition in the form of carbonate/bicarbonate.

| Ingredient | Range (g) | Ratio relative to Quillaia | Range wt. % of powder |
|---|---|---|---|
| Gas Containing Agent | 0.1-10 | 10-100 | 14.06-15.15 |
| Carbonates/Bicarbonates | 0.1-20 | 20-100 | 14.06-30.30 |
| Citric Acid | 0.5-25 | 25-500 | 37.88-70.32 |
| Quillaia | 0.001-1 | 1 | 0.14-1.52 |
| Gelatin | 0.01-10 | 10 | 1.41-15.15 |
| Insoluble Material | 0-20 | 0-2000 | 0-98.4 |
| Total | 0.711-66 | | 100.00 |

EXAMPLE 12

| Tropical Punch Ingredient | g/Liter | % all | grams/L ("active ingr.") | % active |
|---|---|---|---|---|
| Sugar | 116 | 86.622 | | |
| Citric acid | 11.1 | 8.289 | 8.289 | 68.620 |
| Sodium bicarbonate | 0.833 | 0.622 | 0.622 | 5.149 |
| Potassium bicarbonate | 4.16 | 3.106 | 3.106 | 25.717 |
| CWS gel | 1.25 | 0.933 | | 0.000 |
| Quillaia extract | 0.083 | 0.062 | 0.062 | 0.513 |
| Flavor | 0.15 | 0.112 | | 0.000 |
| color | 0.152 | 0.113 | | 0.000 |
| salt | 0.159 | 0.119 | | 0.000 |
| Vitamin C | 0.028 | 0.021 | | 0.000 |
| Total | 133.915 | 100.000 | 12.079 | 100.000 |

1. 40.44 g of the above formula was placed in a glass beaker (internal diameter of 65 mm, uniform wall)
2. 300 ml of water (25° C.) was added to the beaker;
3. This was manually stirred using a teaspoon, 10 times at a speed of 1 rotation per second;
4. 1 minute later the foam height was measured and recorded at 2.7 cm.
5. the foam remained on the top of the liquid for 48 hrs.
Given the volume will be $V=\pi r^2 h$, the volume in milliliters was found to be 89.4 ml. $V=\pi r^2 h$, where V=volume, r=radius, h=height and $\pi=3.14$.

EXAMPLE 13

| Root Beer | g/Liter | % all | grams/L ("active ingr.") | % active |
|---|---|---|---|---|
| Sugar | 41.66 | 72.893 | | |
| Citric acid | 11.54 | 20.192 | 11.54 | 77.815 |
| Sodium bicarbonate | 1 | 1.750 | 1 | 6.743 |
| Potassium bicarbonate | 2.19 | 3.832 | 2.19 | 14.767 |
| Acesulfame potassium | 0.058 | 0.101 | 0.058 | 0.391 |
| Quillaia extract | 0.042 | 0.073 | 0.042 | 0.283 |
| root beer flavor | 0.417 | 0.730 | | 0.000 |
| color | 0.078 | 0.136 | | 0.000 |
| APM | 0.167 | 0.292 | | 0.000 |
| Total | 57.152 | 100.000 | 14.83 | 100.000 |

1. 18.26 g of the above formula was placed in a glass beaker (internal diameter of 80 mm, uniform wall, larger beaker required due to initial foam volume);
2. 300 ml of water (25° C.) was added to the beaker;
3. This was manually stirred using a teaspoon, 10 times at a speed of 1 rotation per second;
4. 30 seconds later the foam height was measured and recorded at 2.4 cm.
Given the volume will be $V=\pi r^2 h$, the volume in milliliters was found to be 120.6 ml.

After 1 minute the foam had begun to break down and was uneven.

A ring of foam 2-3 mm thick remained around the rim of the beaker for 6 hours.

EXAMPLE 14

| PREMADE LIQUID | |
| --- | --- |
| Ingredients | grams |
| cloud | 0.25 |
| thicker/stabilizer | 0.13 |
| sodium citrate | 0.30 |
| high intense sweetener | 0.46 |
| flavor | 0.07 |
| color | 0.01 |
| citric acid | 4.50 |
| water | 994.27 |
| total | 1000.00 |

| DRY FOAMING COMPOSITION | |
| --- | --- |
| Quillaia extract (g) | 0.0200 |
| Foam booster (g) | 0.6000 |

The volume of foam generated by this composition is 22 ml/1000 g of finished product or 35.5 ml/gram of active ingredient (quillaia extract and foam booster).

It will now be apparent to one of ordinary skill in the art that the present beverage composition, which produces foam when dissolved in a liquid, provides features and advantages not found in prior powder beverage compositions and beverage kits. The present composition, when dissolved in a liquid, produces a liquid beverage which mimics freshly squeezed or prepared fruit juices and soda beverages. The resulting liquid, prepared from the present composition, has an appearance, in terms of foam present on the top of the liquid, which resembles freshly prepared beverages. Further, the taste and texture of the resulting liquid beverage mimics that of freshly prepared fruit juices or freshly made soda beverages. If desired, the present powder composition can produce a liquid beverage containing foam or froth on the top of the liquid surface, while the beverage, itself, will not be carbonated or have the appearance or taste which one would identify as being carbonated. Similarly, if desired, the present powder composition can be adjusted to produce a carbonated beverage with foam and/or froth on the top of the liquid surface.

Although the invention has been described in considerable detail with respect to preferred embodiments, it will be apparent that the invention is capable of numerous modifications and variations, apparent to those skilled in the art, without departing from the spirit and scope of the claims. For example, although five fruit beverage flavors are described, other fruit beverages and flavors can be prepared which are consistent with the present disclosure.

The invention claimed is:

1. A powder composition comprising:
   a dry powder gas containing agent composed of amorphous particles having pressurized gas held in internal voids;
   a dry foam stabilizer comprising more than 50% quillaia by weight of a total weight of all foam stabilizers present in the composition; and
   a food acid source,
   wherein, the powder composition is capable of producing foam without mechanical agitation if dissolved in a liquid.

2. The powder composition of claim 1, further comprising a flavor source.

3. The powder composition of claim 2, wherein the flavor source comprises a fruit-flavor.

4. The powder composition of claim 3, wherein the fruit flavor source produces a flavor selected from the group consisting of orange, pineapple, grape, passion fruit, and lemon.

5. The powder composition of claim 3, wherein the fruit flavor source comprises natural fruit or fruit component.

6. The powder composition of claim 2, wherein the flavor comprises a flavor source selected from the group consisting of root beer, cola and fruit-flavored carbonated beverages.

7. The powder composition of claim 1, wherein, if the composition is dissolved in a liquid medium, the resulting beverage has a pH between 2.5 and 5.4.

8. The powder composition of claim 7, wherein the resulting beverage has a pH between 2.5 and 3.5.

9. The powder composition of claim 1, wherein, if the composition is dissolved in a liquid medium, the composition produces at least 2.5 ml foam per gram of said composition on a top surface of the resulting beverage, without mechanical agitation sufficient to incorporate air into the resulting beverage.

10. The powder composition of claim 1, wherein if the composition is dissolved in a liquid, between 2.5 and 3.5 ml of foam per gram of the powder composition is produced on a resulting top surface of the resulting liquid beverage, without mechanical agitation.

11. The powder composition of claim 1, wherein the gas containing agent consists essentially of a carbohydrate.

12. The powder composition of claim 1, wherein the gas containing agent comprises a carbohydrate having entrapped pressurized gas held in internal voids, the gas containing agent capable of releasing the gas upon dissolution in a liquid.

13. The powder composition of claim 1, wherein the gas containing agent comprises maltodextrin.

14. The powder composition of claim 1, wherein the foam stabilizer further comprises soluble gelatin.

15. The powder composition of claim 1, wherein, if the composition is dissolved in a liquid, a foam will be produced on the top surface of the resulting liquid beverage without agitation of the liquid and said foam has a duration of between 15 minutes and 48 hours.

16. The powder composition of claim 1, wherein the powder composition further comprises starch.

17. The powder composition of claim 1, wherein the acid source comprises citric acid.

18. The powder composition of claim 1, wherein, in weight percent of a total amount of the gas containing agent, the foam stabilizer and the food acid, wherein the gas producing agent is present between 0.25 to 99.6 weight percent, the foam stabilizer is present between 0.025 and 81.6 weight percent, and the food acid source is present between 0.337 and 99.45 weight percent.

19. The powder composition of claim 1, further comprising an insoluble material.

20. The powder composition of claim 19, wherein, in weight percent of a total amount of the gas containing agent, the foam stabilizer and the food acid, wherein the gas producing agent is present between 0.25 to 99.6 weight percent, the foam stabilizer is present between 0.025 and 81.6 weight percent, the food acid source is present between 0.337 and 99.45 weight percent and the insoluble material is present between 0.022 to 98.84 weight percent.

21. The powder composition of claim 19, wherein the insoluble material comprises one or more hydrocolloids.

22. The powder composition of claim 19, wherein the insoluble material comprises dried pulp.

23. The powder composition of claim 19, wherein the insoluble material is composed of a material having an average particle size of between 0.1 and 850 microns.

24. The powder composition of claim 19, wherein the insoluble material is composed of a material having a maximum dimension of between 0.1 and 3000 microns.

25. The powder composition of claim 19, wherein, if the composition is dissolved in a liquid medium, the resulting beverage has a concentration of 1 to 150 g composition per liter and a viscosity of between 1.0 and 10.0 cP at a temperature between 2 and 28° C.

26. A dry powder comprising:
a dry composition comprising a powder composed of the following ingredients:
a dry gas containing agent composed of amorphous particles or a dry gas producing agent,
dry quillaia present in an amount greater than 50% by weight of a total amount of all foam stabilizers present in the dry powder, and
a food acid,
wherein, if the dry composition is dissolved in a liquid medium, the resulting beverage has a pH between 2.5 and 5.4, and wherein the dry composition is capable of producing at least 2.5 ml foam per gram of said powder on a top surface of the resulting beverage, without mechanical agitation sufficient to incorporate air into the liquid.

27. The powder of claim 26, wherein the gas containing agent consists essentially of a carbohydrate.

28. The powder of claim 26, wherein the gas containing agent comprises a non-protein composition.

29. The powder of claim 26, wherein the gas containing agent comprises a carbohydrate containing entrapped pressurized gas held in internal voids.

30. The powder of claim 26, wherein the gas producing agent comprises at least one of a carbonate or a bicarbonate compound.

31. The powder of claim 26, wherein the powder further contains cold water soluble gelatin.

32. The powder of claim 26, wherein if the composition is dissolved in a liquid, a foam would be produced on a top surface of a resulting liquid beverage, the foam having a duration of between 15 minutes and 48 hours.

33. The powder of claim 26, wherein the food acid is citric acid.

34. The powder of claim 26, wherein the ingredients are in weight percent of the powder amount as follows:
the gas containing agent or gas producing agent is in an amount between 0.25 to 99.6 weight percent, the foam stabilizer is present between 0.025 and 81.6 weight percent, the food acid source is present between 0.337 and 99.45 weight percent and the insoluble material is present between 0.022 to 98.84 weight percent.

35. The powder of claim 26, further comprising an insoluble material.

36. The powder of claim 35, wherein, in weight percent of a total composition amount, the insoluble material is present between 0.022 to 98.84 weight percent.

37. The powder of claim 35, wherein the insoluble material comprises one or more hydrocolloids.

38. The powder of claim 35, wherein the insoluble material comprises dried pulp.

39. The powder of claim 35, wherein the insoluble fiber is composed of a material having an average particle size of between 0.1 and 850 microns.

40. The powder of claim 35, wherein the insoluble fiber is composed of a material having a maximum dimension of between 0.1 and 3000 microns.

41. The powder of claim 35, wherein, if the composition is dissolved in a liquid medium, the resulting beverage would have a concentration of 1 to 150 g composition per liter and a viscosity of between 1.0 and 10.0 cP at a temperature between 2 and 28° C.

42. A dry powder comprising:
a composition comprising ingredients in weight percent of the total composition amount:
a gas containing agent composed of amorphous particles or gas producing agent in an amount 0.25 to 99.6 weight percent, a foam stabilizer comprising more than 50% quillaia by weight of a total weight of all foam stabilizers present in the composition and present between 0.025 and 81.6 weight percent, a food acid source present between 0.337 and 99.45 weight percent and insoluble material is present between 0.022 to 98.84 weight percent wherein, if dissolved in liquid, the composition produces foam without mechanical agitation.

43. The powder of claim 42, wherein the gas containing agent consists essentially of a carbohydrate.

44. The powder of claim 42, wherein the gas producing agent comprises at least one of a carbonate or a bicarbonate compound wherein if the carbonate or bicarbonate in combination with the acid source are dissolved in a liquid, foam is produced without mechanical agitation.

45. The powder of claim 42, wherein if the composition is dissolved in a liquid, between 2.5 and 35 ml of foam per gram of the material is produced on a resulting top surface of the resulting liquid beverage without mechanical agitation.

46. The powder of claim 42, wherein if the composition is dissolved in a liquid, a foam is produced on a top surface of the resulting liquid beverage, the foam having a duration of between 15 minutes and 48 hours, without mechanical agitation.

47. The powder of claim 42, wherein the food acid is citric acid.

48. The powder composition of claim 1, wherein the composition is soluble at 1-150 grams per liter in water at a temperature between 2 and 28° C.

49. The powder of claim 26, wherein the gas producing agent is present in an amount of 0.25 to 99.6 weight percent of a total composition amount.

50. The powder of claim 26, wherein the composition is soluble at 1 to 150 grams per liter in water at a temperature between 2 and 28° C.

51. A composition comprising:
a powder composed of the following ingredients:
a dry gas producing agent,
a dry foam stabilizer comprising more than 50% quillaia by weight based on a total weight of all foam stabilizers present in the powder, and
a dry food acid source,
wherein the gas producing agent is present in an amount of 0.25 to 99.6 weight percent based on an amount of the powder and wherein the powder is capable of producing foam if dissolved in a liquid without mechanical agitation.

52. The composition of claim 51, wherein the powder is soluble at 1 to 150 grams per liter in water at a temperature between 2 and 28° C.

53. A beverage kit comprising:
a liquid beverage comprising a food acid source; and
a powder component comprising a gas containing agent composed of amorphous particles and a foam stabilizer comprising at least 50% quillaia by weight of a total weight of the foam stabilizer present in the beverage kit,
wherein, if the powder component is placed in the liquid beverage, at least 2.5 ml of foam is produced per gram of the powder component on top of the resulting beverage without mechanical agitation sufficient to incorporate air into the liquid.

54. The beverage kit of claim 53, wherein the liquid beverage or the powder component further comprises an insoluble material.

55. The beverage kit of claim 53, wherein the gas containing agent comprises a carbohydrate.

56. The beverage kit of claim 53, wherein if the powder component is placed in the liquid beverage, the resulting foam has a duration of at least 15 minutes.

57. The beverage kit of claim 53, wherein if the powder is dissolved in the liquid beverage, the viscosity of the liquid beverage after the powder is placed therein is between 1.0 and 10.0 cP at a temperature between 2 and 28° C.

58. The powder of claim 30, wherein if dissolved in a liquid the carbonate or bicarbonate and the food acid combine to produce foam.

59. A powder composition comprising:
a gas containing agent composed of amorphous particles having entrapped pressurized gas held in internal voids which is capable of releasing the pressurized gas dissolution if placed in a liquid,
a dry foam stabilizer comprising quillaia present in an amount more than 50% by weight of a total amount of foam stabilizer in the powder composition,
a dry food acid source, and
an insoluble material,
wherein the gas containing agent is capable of releasing the entrapped pressurized gas if contacted with a liquid to thereby produce foam without mechanical agitation.

60. The powder composition of claim 59, wherein the insoluble material is fiber.

61. The powder composition of claim 59, further comprising a fruit-flavor.

62. A powder composition comprising:
a dry gas generating agent,
a foam stabilizer comprising quillaia present in an amount more than 50% by weight of a total amount of foam stabilizer in the powder composition,
a dry food acid source, and
optionally a fiber material,
wherein if the dry gas generating agent and the dry food acid source are combined in the presence of a liquid, the dry gas generating agent and the dry food acid source are capable of producing a foam without mechanical agitation.

63. The powder composition of claim 62, further comprising a fruit-flavor.

64. A cold-soluble powder composition comprising:
a dry gas containing agent composed of amorphous particles having entrapped pressurized gas held in internal voids,
dry quillaia present in an amount of more than 50% of a total amount of all foam stabilizers present in the powder composition,
a dry food acid source, and
an insoluble material,
wherein:
wherein if the dry gas containing agent is contacted with a liquid, the dry gas containing agent is capable of releasing the entrapped pressurized gas from the internal voids if contacted with a liquid to thereby produce foam without mechanical agitation, to produce a resulting beverage, and
the resulting beverage would have a pH between 2.5 and 5.4, and
5.5 grams of dry gas containing agent, quillaia and the dry food acid are capable of being dissolved in 30 liters at a temperature between 2 to 10° C.

* * * * *